United States Patent
Rodriguez et al.

(10) Patent No.: US 11,607,070 B1
(45) Date of Patent: Mar. 21, 2023

(54) LIGHTWEIGHT PORTABLE HEATING DEVICE

(71) Applicant: Mainstream Engineering Corporation, Rockledge, FL (US)

(72) Inventors: Christian O. Rodriguez, Melbourne, FL (US); Robert P. Scaringe, Indialantic, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 462 days.

(21) Appl. No.: 16/926,852

(22) Filed: Jul. 13, 2020

(51) Int. Cl.
| | |
|---|---|
| *A47J 27/18* | (2006.01) |
| *F24C 1/16* | (2021.01) |
| *F24C 15/00* | (2006.01) |
| *F24C 15/30* | (2006.01) |
| *A47J 36/26* | (2006.01) |
| *F24C 3/14* | (2021.01) |

(52) U.S. Cl.
CPC ............ *A47J 27/18* (2013.01); *A47J 36/26* (2013.01); *F24C 1/16* (2013.01); *F24C 15/002* (2013.01); *F24C 15/30* (2013.01); *F24C 3/14* (2013.01)

(58) Field of Classification Search
CPC .......... A47J 27/18; A47J 27/026; A47J 36/26; F24C 1/16; F24C 15/002; F24C 15/30; F24C 15/32; F24C 3/14
USPC ............ 126/376.1, 391.1, 390.1, 266
See application file for complete search history.

(56) References Cited

U.S. PATENT DOCUMENTS

| | | | | |
|---|---|---|---|---|
| 205,391 A | * | 6/1878 | Jackson | F24C 3/14 126/40 |
| 412,821 A | * | 10/1889 | Wright | A47J 36/36 126/376.1 |
| 754,838 A | * | 3/1904 | Bates | A47J 36/36 126/376.1 |
| 852,556 A | * | 5/1907 | Hall | A47J 27/18 99/413 |
| 1,106,042 A | * | 8/1914 | Gumm | B28B 7/183 99/428 |

(Continued)

FOREIGN PATENT DOCUMENTS

| | | | | |
|---|---|---|---|---|
| JP | 57202261 A | * | 12/1982 | A47J 27/18 |
| KR | 20170101461 A | * | 2/2016 | A47J 37/0641 |

OTHER PUBLICATIONS

"JP_57202261_A_I—Machine Translation.pdf", machine translation, J-PlatPat/JPO.org, Dec. 1, 2022. (Year: 2022).*

*Primary Examiner* — Steven B McAllister
*Assistant Examiner* — Daniel E. Namay
(74) *Attorney, Agent, or Firm* — Michael W. O'Neill, Esq.

(57) ABSTRACT

A lightweight portable heating device consisting of a container assembly and lid assembly that house a tub assembly for the purpose of heating liquids and food submerged in aforementioned liquids by means of a multi-fuel burner. Container assembly provides for several structures that improve ergonomics and handling of the lightweight portable heating device. For instance, container assembly includes an integrated handle that surrounds the container assembly proximate the top portion of the container assembly and is molded into the container assembly. Integrated handle allows for the ease of moving of the lightweight portable heating device by personnel. Proximate the bottom (Continued)

of container assembly are lifting handles that enable the lifting of the device above shoulder level while also functioning as a tie down point.

10 Claims, 10 Drawing Sheets

(56) References Cited

U.S. PATENT DOCUMENTS

| | | | | |
|---|---|---|---|---|
| 1,520,860 A * | 12/1924 | Denz | ................... | A47J 37/1214 99/406 |
| 1,677,227 A * | 7/1928 | Blattner, Jr. | ............ | A47J 27/18 126/346 |
| 1,912,288 A * | 5/1933 | Lundt | ..................... | F27B 14/14 432/209 |
| 1,974,392 A * | 9/1934 | Kemp | ..................... | F27B 14/14 126/343.5 A |
| 2,137,693 A * | 11/1938 | Lundt | ..................... | F27B 14/00 126/376.1 |
| 2,185,594 A * | 1/1940 | Kittel | ........................ | C10C 3/12 126/376.1 |
| 2,197,034 A * | 4/1940 | Douglass | ................ | A45C 11/20 312/236 |
| 2,504,132 A * | 4/1950 | Jones | ..................... | A45C 11/20 126/261 |
| 2,655,144 A * | 10/1953 | Keating | ............... | A47J 37/1247 126/391.1 |
| 4,796,523 A * | 1/1989 | Mette | ..................... | A47J 27/18 99/477 |
| 5,417,202 A * | 5/1995 | Cote | ................... | A47J 37/1247 99/330 |
| 5,975,071 A | 11/1999 | Babington | | |
| 6,237,586 B1 * | 5/2001 | Fontes | ..................... | F24H 1/54 126/376.1 |
| 6,570,133 B1 * | 5/2003 | Grosso, Sr. | ............. | A47J 36/26 219/387 |
| 7,100,599 B2 | 9/2006 | Babington | | |
| 2010/0000511 A1 * | 1/2010 | Koropoulis | ......... | A47J 37/0704 126/25 R |
| 2017/0208984 A1 * | 7/2017 | Cai | ......................... | A47J 36/02 |

* cited by examiner

LIGHTWEIGHT PORTABLE HEATING DEVICE

STATEMENT REGARDING FEDERALLY SPONSORED RESEARCH OR DEVELOPMENT

This invention was made with government support under Contract No. W911QY-18-9-0017 awarded by the United States Department of the Army. The government has certain rights in the invention.

BACKGROUND

The present invention is directed to tray ration heating systems (TRHS). Particularly, the present invention is concerned with a new and improved tray ration heater (TRH) that takes advantage of modern components and manufacturing techniques.

Army and Marine Corps mobile field feeding systems provide a method to prepare solider rations through the use of heavy fuel burner integrated appliances. A major element of several field feeding systems, such as the Army Assault Kitchen (AK), is the TRH, which uses a heavy-fuel burner to prepare Unitized Group Ration Heat & Serve (UGR H&S) tray packs. The prior art TRH can heat up to 18 tray packs, which can feed up to 250 persons, by heating 30 gallons of water to a temperature between 180-200° F. The same water can be used multiple times between cleaning, and the prior art TRH can heat water while on the move, making the prior art TRH a critical appliance for group ration preparation.

Although the TRH provides critical functionality to the services for field feeding, the legacy unit has several deficiencies that limit further employment. Specifically, the weight, maneuverability, and maintainability leave considerable room for improvement. For instance, the prior art TRH weighs 285 lbs. empty or 400 lbs. when loaded with meals (18 UGRs with rack) and water (30 gal). The legacy TRH is constructed of heavy-gauge stainless steel. Because of its weight, the TRH is a four-man lift (per MIL STD 1472 F) and is awkward to carry and maneuver into the cargo bed of the HMMWV given the placement of the handles. The legacy unit also has low efficiency, requiring longer heating times and greater fuel consumption. Our improved configuration results in improved efficiency and shorter heating times.

For the foregoing reasons, there is a need for a new and improved TRH that is superior thermal efficiency, lightweight, and highly maneuverable.

SUMMARY

The new and improved TRH is a lightweight portable heating device consisting of a container assembly and lid assembly that house a tub assembly for the purpose of heating liquids and food submerged in aforementioned liquids by means of a multi-fuel burner. Although the container assembly can be manufactured through a variety of methods, the new and improved TRH uses Rotational Molding (rotomolding) manufacturing techniques that enable the fabrication of the container with all the critical features from a polymeric material.

The container assembly houses the tub assembly and the mounting point for the burner box assembly, while a lid assembly will cover the tub assembly and is latched to the container assembly using latches. The container assembly provides for several structures that improve ergonomics and handling of the new and improved TRH. For example, the container assembly includes one or more integrated handles that surround the container assembly proximate the top portion of the container assembly and these handles are molded into the container assembly. The integrated handle allows for the ease of moving of the new and improved TRH by personnel. Proximate the bottom of container assembly are lifting handles. Lifting handles are preferably made from metal and enable the lifting of the new and improved TRH above shoulder level while also functioning as a tie down point. Further lifting handles can be made removable. In addition the new and improved TRH has skids, which can also be removable and/or replaceable, attached at the bottom of the container to protect the base of the unit from wear and allow for easy push/drag of the new and improved TRH along a multitude of terrain and surfaces.

The tub assembly of the new and improved TRH includes a combustor section, plural totally-submerged combustion byproduct flow passages, a first turning manifold, a second turning manifold, an exit manifold, and an exhaust port. The combustion byproducts exit the combustion section and enter a center set of parallel flow passages that guide the combustion byproducts towards the first turning manifold. The first turning manifold combines the combustion byproducts from the center set of flow passages and allows the combustion byproducts to turn around and enter the second set of intermediate combustion byproducts flow passages to travel towards the second turning manifold located on the opposite side near the entrance of the combustor section. Upon arrival at the second turning manifold, the combustion byproducts from the intermediate flow passage section once again recombines, turns around, enters the outer set of final flow passages and travels towards the exit plenum. The exit plenum combines the flow from the outer set of flow passages and redirects it towards the exhaust port where the combustion byproducts exit the new and improved TRH.

BRIEF DESCRIPTION OF THE DRAWINGS

These and other features, aspects, and advantages of the present invention will become better understood with regard to the following description, appended claims, and accompanying drawings where:

DESCRIPTION

In the Summary above and the Description, and the claims below, and in the accompany drawings, reference is made to particular features (including method steps) of the invention. It is to be understood that the disclosure of the invention in this specification includes all possible combinations of such particular features. For example, where a particular aspect or embodiment of the invention, or a particular claim, that feature can also be used, to the extent possible, in combination with and/or in the context of the other particular aspects and embodiments of the invention, and in the invention generally.

Figure 1:
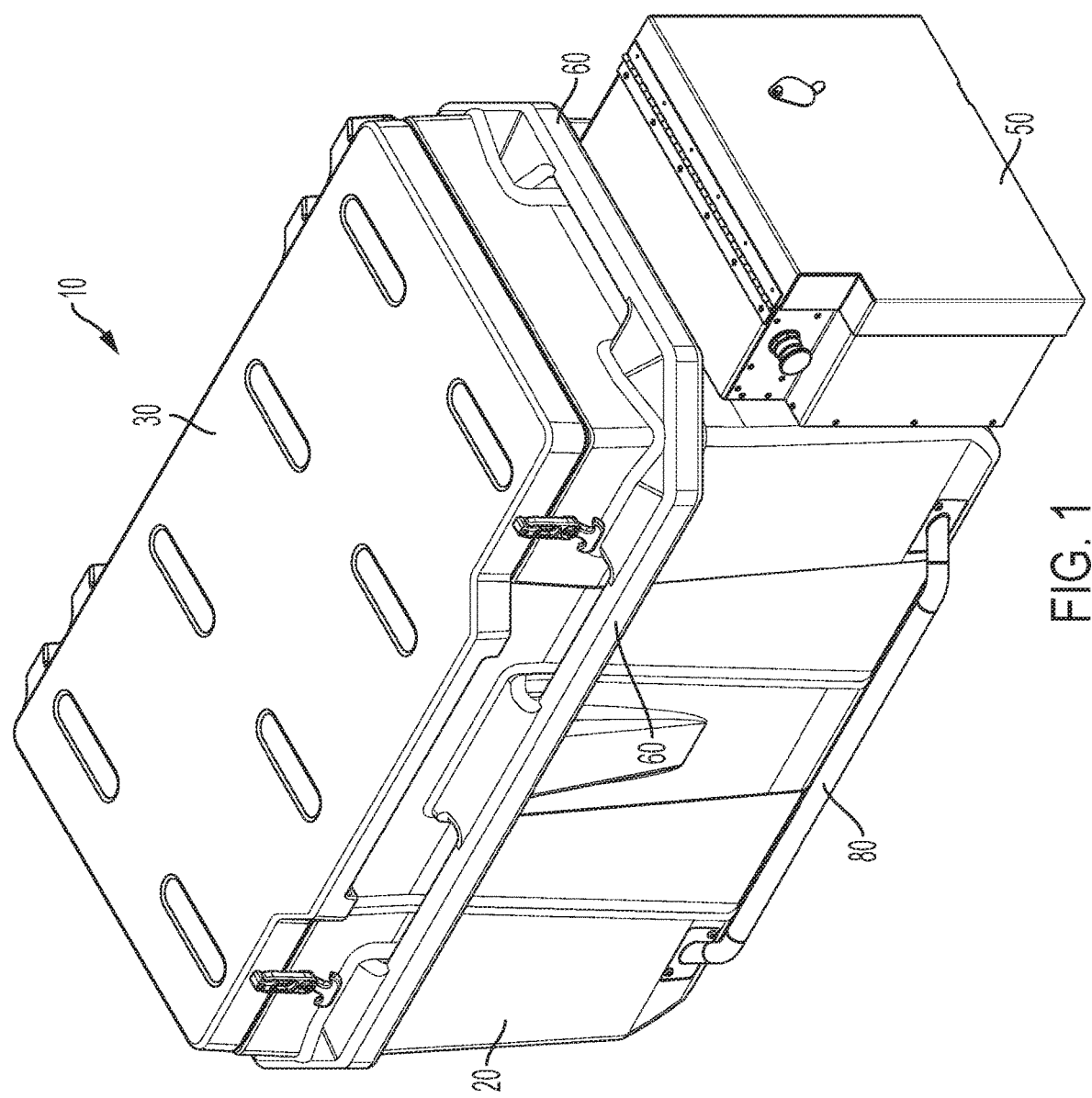
FIG. 1 shows a perspective view of the top, front, and right side of the lightweight portable heating device.
Figure 2:
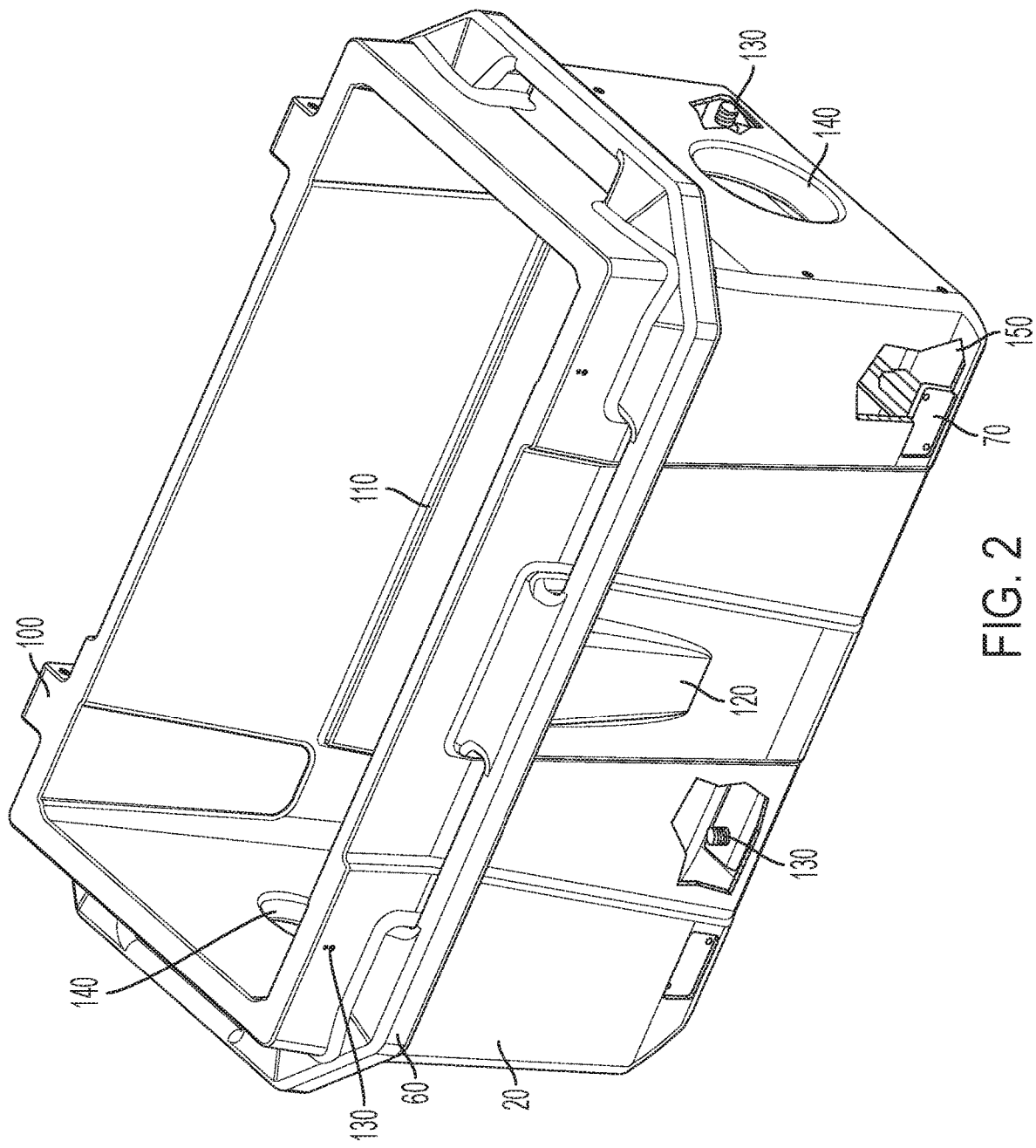
FIG. 2 shows a perspective view of the container assembly with cutaways and the lid removed.
Figure 3:
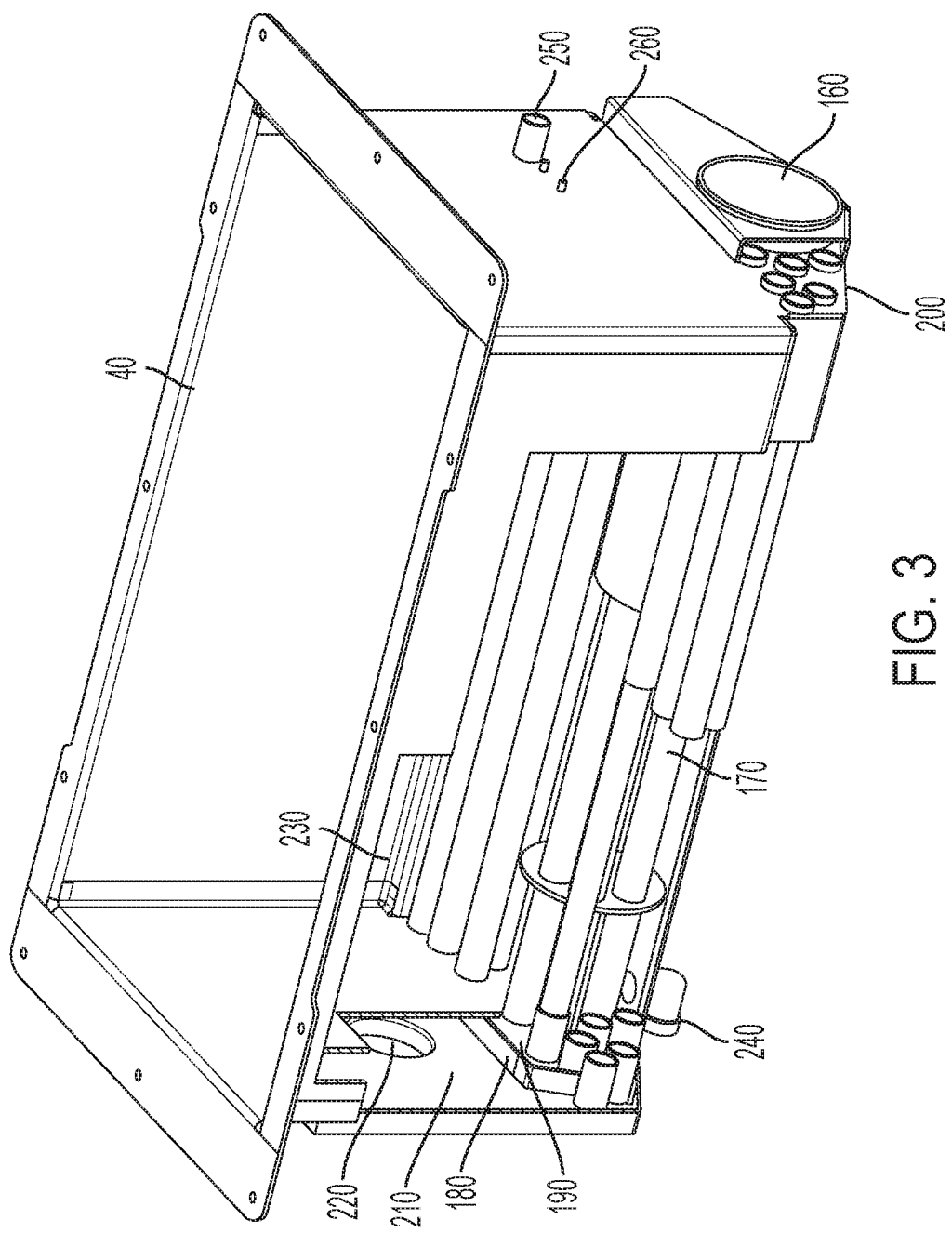
FIG. 3 shows a perspective and cut away view of the tub assembly for the lightweight portable heating device.
Figure 7:
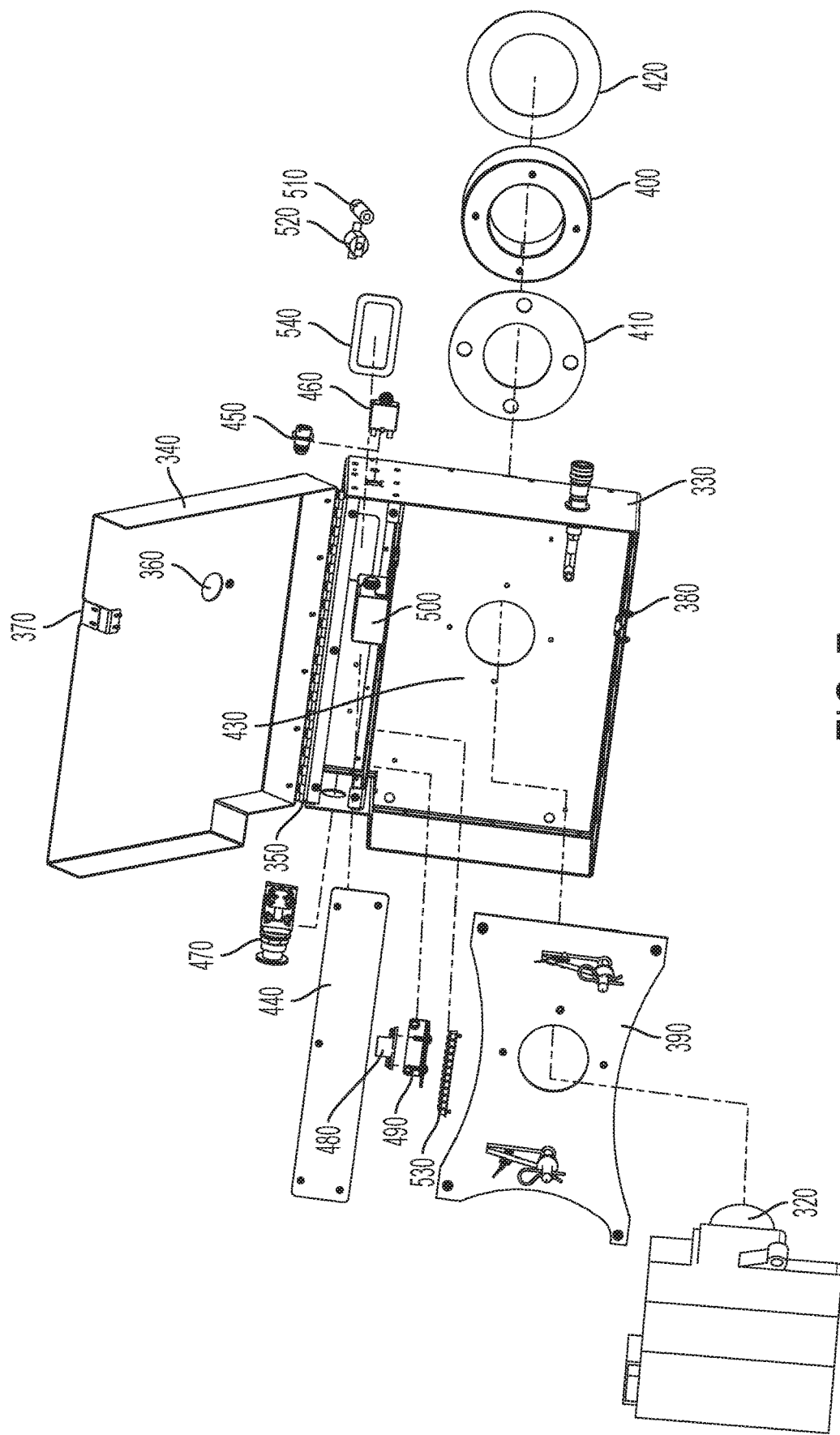
FIG. 7 shows an exploded view of the burner assembly for the lightweight portable heating device.
Figure 8:
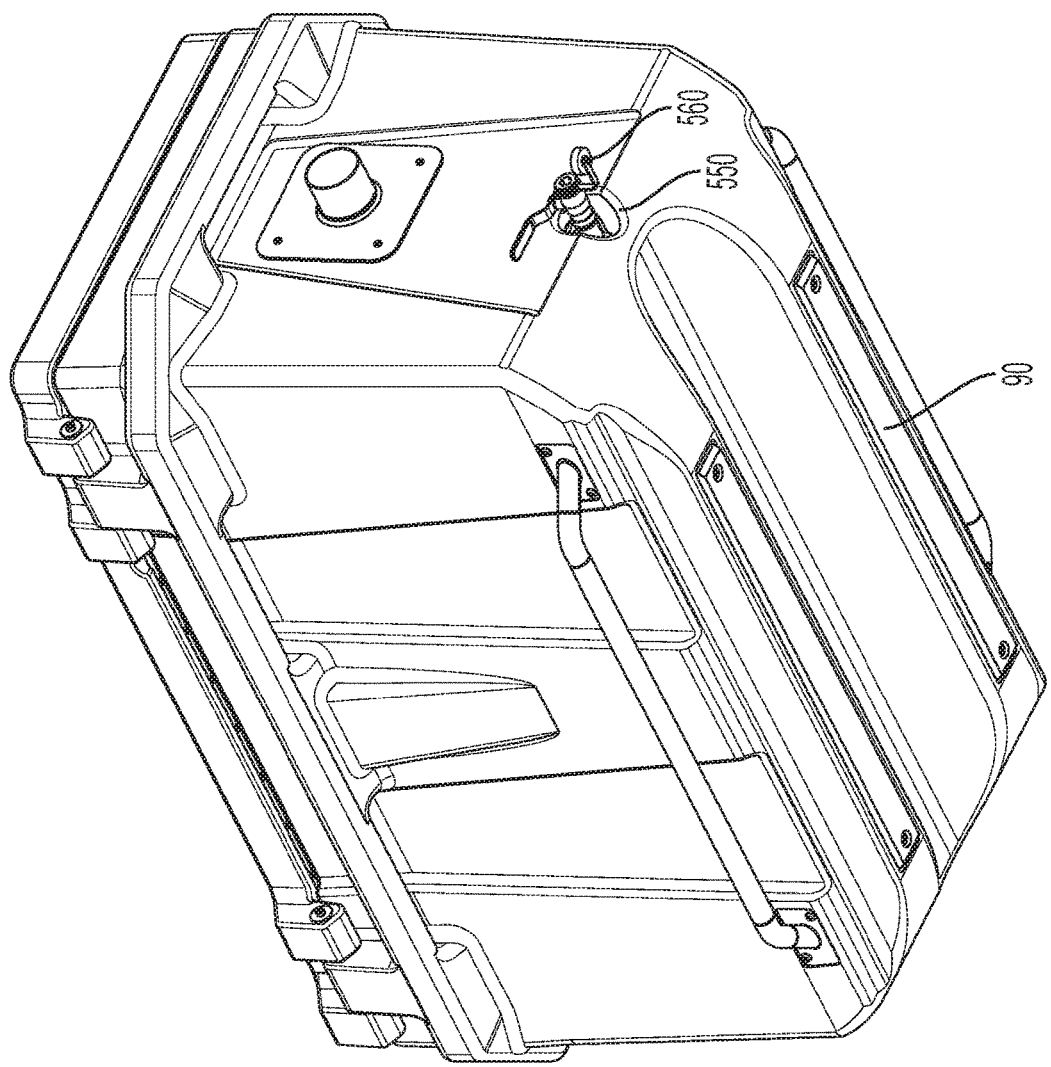
FIG. 8 shows a perspective view of the bottom, rear, and left side of the lightweight portable heating device.
Figure 10:
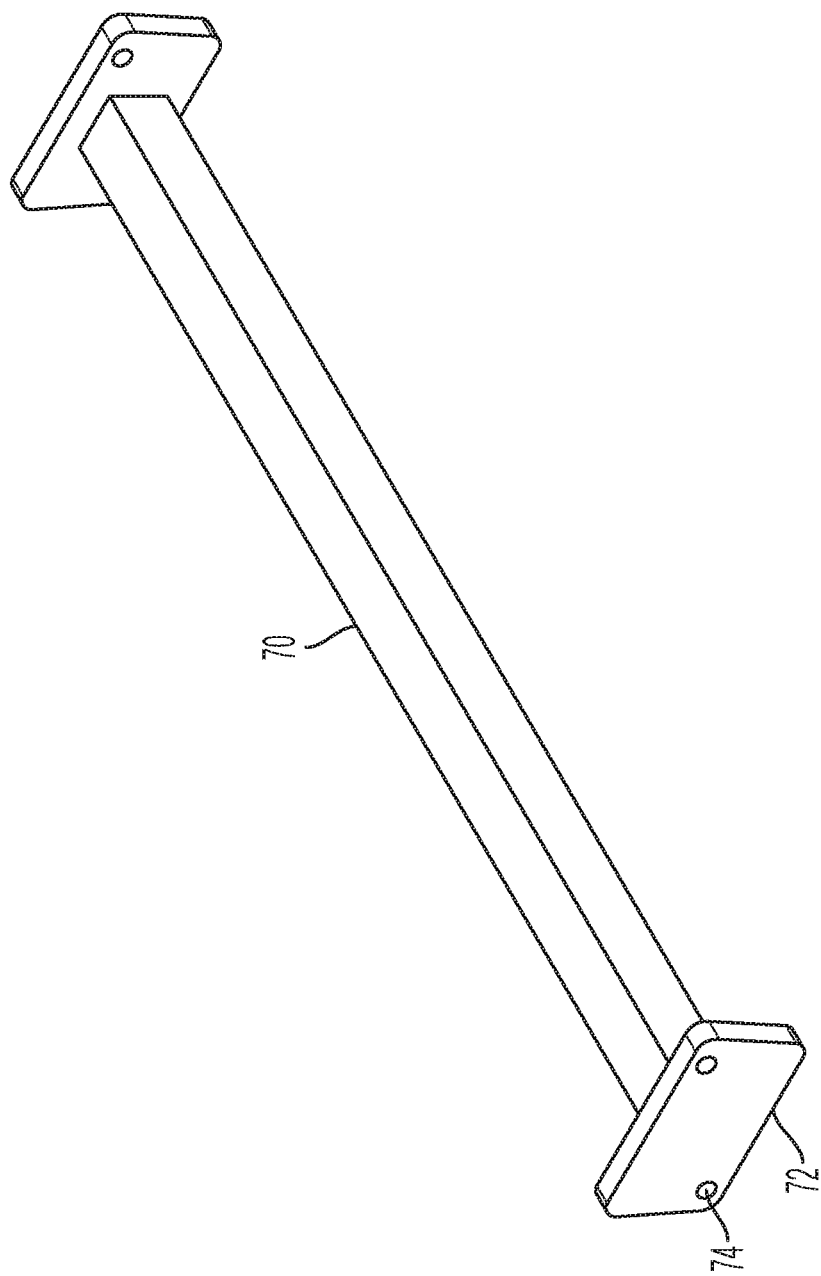
FIG. 10 shows a support structure assembly that is contained within the container assembly.

In FIG. 1, the lightweight portable heating device 10 consists of a container assembly 20 and lid assembly 30 that house a tub assembly 40, see FIGS. 3 and 8, for the purpose of heating liquids and food submerged in aforementioned liquids by means of a burner 320, see FIG. 7. Although the container assembly 20 can be manufactured through a variety of methods, the present embodiment uses rotomolding manufacturing techniques that enable the fabrication of the container with all the critical and beneficial features from a polymeric material. As shown in FIG. 2, a support structure assembly 70, see FIG. 10, can be inserted into the mold cavity such that once the container assembly is rotomolded, the support structure 70 will be completely encapsulated within, thereby strengthening the container assembly 20 and transfer loads through the support structure assembly 70 rather than the container assembly 20. As shown in FIG. 10, the support structure assembly has flanges 72 on the ends and threaded inserts 74 that will accommodate the lifting handles 80 which will be discussed below.

The container assembly 20 houses the tub assembly 40 within its four walls, acts as the anchor for the lid assembly 30, and the mounting point for the burner box assembly 50. In addition, container assembly 20 provides for several structures that improve ergonomics and handling of the portable heating device 10. As shown in FIGS. 1 and 2, container assembly 20 includes an integrated handle 60 that is attached to the four walls and surrounds the container assembly 20 proximate the top portion of the container assembly 20 and is molded into the container assembly. Integrated handle 60 allows for the ease of moving of the lightweight portable heating device 10 by personnel. Integrated handle 60 is contoured, along with container assembly 20 to permit the ease of hands with bulky gloves to grab hold of the integrated handle 60. Proximate the bottom of container assembly 20 are lifting handles 80 that are attached to each side wall. Lifting handles are preferably made from metal and enable the lifting of the lightweight portable heating device 10 above shoulder level while also functioning as a tie down point. Further lifting handles 80 can be made removable. The lifting handles may be attached to the container assembly by threaded fasters (not shown) that would thread into the thread inserts 74 on the flanges 72 attached to the support structure assembly 70. As shown in FIG. 8, skids 90 attached at the bottom of the container to allow for easy push/drag of the lightweight portable heating device 10 along a multitude of terrain and surfaces. Skids 90 can be made removable so that they can be replaced when worn out due to scraping over rough or abrasive terrain. The skids can also be replaced with wheel assembles (not shown) to allow transport over paved surfaces. In addition, the skids can be removed and the skid mounting fixtures used to secure the improved TRH to a structure such as a truck bed or ship surface (not shown).

As best shown in FIG. 2, container assembly 20 has a number of additional features. Integrated container hinge 100 will connect with complementary integrated lid hinge 115 (FIG. 6) on lid assembly 30. The interior of the container assembly 20 includes an integrated shelf 110 for supporting the tub assembly 40 especially when the tub assembly 40 is filled with liquid. On the exterior of container assembly 20 are integrated support structures 120. Integrated support structure 120 provide additional support and rigidity to the lightweight portable heating device 10 without adding a substantial increase in weight. The integrated support structure smoothly tapers into the sidewall of the container subassembly 20 to avoid any potential snagging points or edges. In addition, integrated support structures 120 located on the side walls provide additional strength to the integrated handle 60 that surrounds the container assembly 20. Throughout the exterior and interior surfaces of the container assembly 20, threaded inserts 130 have been molded into the structure and are positioned at strategic points in order to secure other essential and optional components for the lightweight portable heating device 10. Access holes 140 located in both the first and second end walls are molded into the container assembly 20 and are used to insert equipment needed for the distribution of combustion byproducts through the lightweight portable device 10. The internal cavity of the rotomolded assembly container 20 may be optionally filled with foam 150 for the purposes of providing thermal insulation, noise insulation, increasing rigidity, and providing overall strength to the container. There are many types of foams that can be used, some providing better stiffness or crush resistance white others providing better insulative or buoyancy benefits. As a minimum, polyurethane, polystyrene, syntactic, and polyethylene foams can be used individually or combined in the internal cavities of the rotomolded tub and cover.

FIG. 3 illustrates the tub assembly 40 that fits inside the container assembly 20. The tub assembly 40 is a metal structure that is essentially four walls and a base that contains the liquid to be heated and hot combustion product flow passages (piping or tubing) 170 through which hot combustion byproducts from the burner can flow in order to transfer heat to the liquid present within the tub assembly 40. In this embodiment, the tub assembly 40 is manufactured from stainless steel since it offers a hygienic, non-corrosive material option to be used with most common materials that can also sustain the elevated temperatures from the combustion byproducts. As shown in FIG. 3, the tub assembly 40 consists of a combustion gas chamber section 160, flow passages 170 located in the base of the tub assembly 40 and run parallel to the side walls of the tub assembly 40, manifold dividing bulkhead 180, a first turning manifold 190, a second turning manifold 200, exit manifold 210, exhaust port 220, shelf 230, drain 240, probe support 250, and sensor mount 260. The combustion gas chamber section 160 serves to contain the burner's 320 flame coming from the burner box 50, after which combustion byproducts will enter the seven first-pass combustion byproduct flow passages 170A (see FIGS. 4 and 5) that are in contact with the liquid within the tub assembly 40 in order to heat up the liquid. Since the combustor section 160 and flow passages 170 are submerged within the fluid and completely surrounded by the fluid in this design, the maximum temperatures of these components are exposed to is somewhat limited by the boiling point of the fluid, thereby allowing the use of widely available, lower cost metal materials such as stainless steel rather than exotic superalloy alternatives such as Hastelloy.

Figure 4:
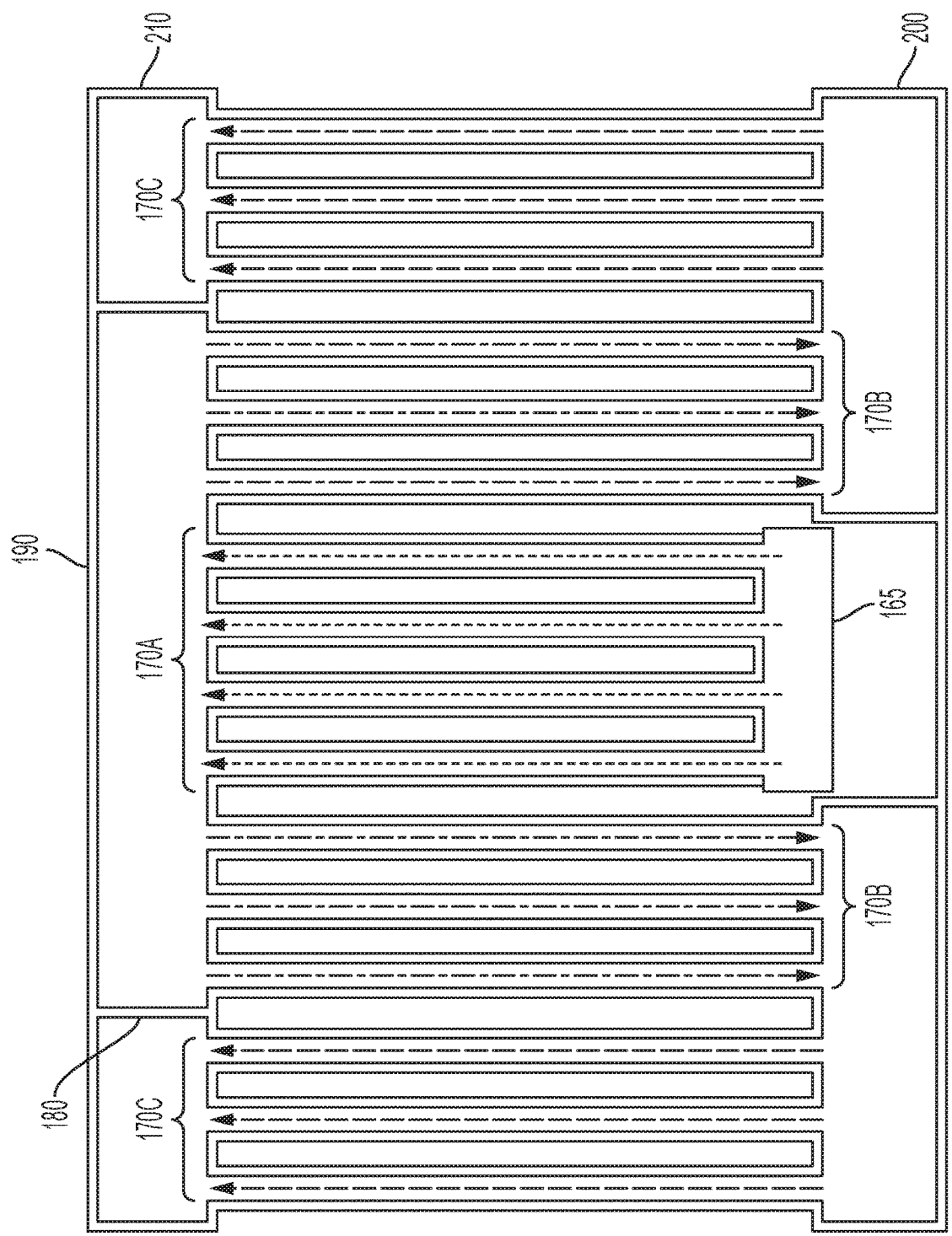
FIG. 4 shows a schematic representation of the flow path of combustion byproducts through the piping.

As shown in FIG. 4, the flow passages are comprised of multiple series passes through the liquid located in the tub 40 and starting with the intake manifold 165 that distributes the combustion byproducts within the combustion gas chamber section 160 into the first set of parallel flow passages 170A.

In this parallel-series flow configuration (our currently preferred embodiment), there are three passes, the first group of seven parallel flow passages 170A (four being shown to avoid complexity in the FIG. 4) being submerged in the liquid and located in-between the combustor outlet and the first turning manifold 190 in the center region of the tub base. The first turning manifold 190 then turns the flow from these seven initial passages and redirects the hot combustion gas byproducts back through the liquid region (second pass) of the tub via the second group of six parallel combustion passages 170B, where three combustion flow passages are located on each side of the initial first pass of seven passages. The second turning manifold 200 then creates a third pass through the liquid by turning the flow from these six parallel flow passages and redirects the combustion gas byproducts back through the liquid region of the tub via the third group of six parallel combustion passages 170C, where three passages are located on each side of the second pass passages. The combustion byproduct gasses then exit these six tubes and are recombined in the exit manifold 210 and directed to the exhaust port 220 by the exit manifold 210. In this embodiment, to reduce manufacturing costs and simplify assembly the first and exit manifolds are manufactured as a single integrated manifold and bulkheads 180 are secured to this single manifold and the bulkheads 180 are used to separate the flow in the first turning manifold 190 from the flow in the exit manifold 210 that travels up to the exhaust port 220.

It is well known in the art to design parallel, series, or combinations of parallel and series flow paths in a heat exchanger, such as a shell and tube heat exchanger, and therefore it is to be understood that while three passes of the combustion products through the liquid with seven parallel passages in the first pass and six parallel passages in the second and third passes has been described, other parallel and series flow combinations can be utilized.

Figure 5:
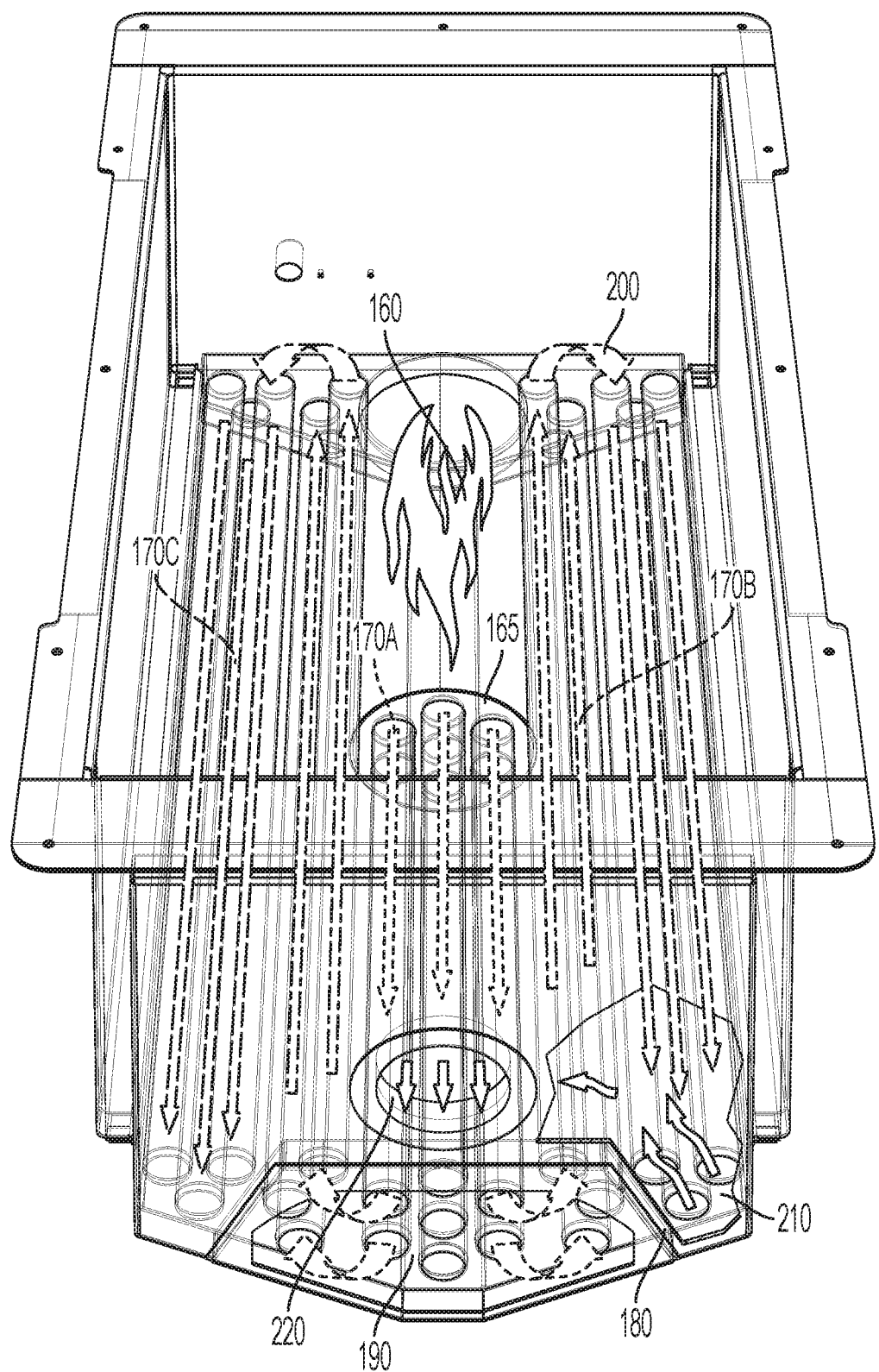
FIG. 5 shows a perspective view of the piping within the tub assembly and a perspective view of the path of the combustion byproducts through the piping.

FIG. 5 illustrates the inventive transfer of combustion byproducts through the tub assembly 40 to increase surface area and minimize heat losses to ambient, thereby improving thermal efficiency and allowing use of lightweight lower melting point insulation and construction material not contemplated within the prior art. This unique design assures that the wall temperatures of the flow passages are kept from being extremely high because theses passages are completely surrounded by the fluid being heated and the fluid's temperature is limited to the boiling point of the fluid. This allows the use of less expensive and more conventional metals, such as stainless steel or aluminum, instead of exotic alloys, such as Hastelloy. Also since the heat released from the combustion byproducts is essentially all directed into the fluid in the tub, the exterior shell of the container subassembly can be made of low melting point materials including plastics, such as rotomolded plastic, instead of metal.

As shown in FIG. 5, the combustion byproducts enter the tub assembly 40 through the combustion gas chamber section 160 and travel through intake manifold 165 to enter into the combustion gas flow passages 170A located in the center portion of the lower section of the tub assembly 40 until reaching the first turning manifold 190 located opposite of the combustion gas chamber section 160. The first turning manifold 190 forces the combustion byproducts to turn into a second set of combustion gas flow passages 170B that are also in contact with the liquid in the tub assembly 40. Once the combustion byproducts reach the second turning manifold 200 which is proximate to the combustion gas chamber section 160, the combustion byproducts once again are turned, by the second turning manifold 200, into a third set of combustion gas flow passages 170C that terminate at the exit manifold 210 prior to exiting through the exhaust port 220. To reduce manufacturing and assembly costs, the first manifold and exit manifold (which are both located on the same side of the tub) are fabricated as a single manifold chamber and an internal bulkhead 180 then divides this volume into two distinct manifold chambers.

To better explain, the combustion byproducts exit the combustion gas chamber section 160 and enter the center set of seven individually submerged combustion byproduct flow passages 170A that guide the combustion byproduct towards the first turning manifold 190. The internal bulkhead 180 delineates the first turning manifold 190 from the exit manifold 210 to ensure the combustion gas byproducts flow from the center seven individual flow passages 170A only returns through the six intermediate submerged flow passages 170B. The first turning manifold 190 combines the combustion byproducts from the center set of flow passages 170A and allows the combustion byproducts to turn around and enter the next set of six intermediate flow passages 170B (located three passages on each side of the seven center passages 170A) to travel towards the second turning manifold 200 located on the opposite side near the entrance of the combustion gas chamber section 160. Upon arrival at the second turning manifold 200, the combustion byproducts from the intermediate passages 170B once again recombine, turn around, and are directed to flow into the outer set of six final passages 170C and travels towards the exit manifold 210. The exit manifold 210 combines the flow from the outer set of six final passages 170C and redirects it towards the exhaust port 220 where the combustion byproducts exit the lightweight portable heating device 10. As stated previously, while this embodiment has described a three series flow path arrangement with seven parallel passages in the first pass and six parallel flow passages in the second and third passages, any number of parallel-series flow combinations could be accommodated in this invention.

It should be noted that although this particular design uses manifolds in which the combustion byproducts incoming from discrete tubular passageways are combined prior to once again being discretized into exiting tubular passageways, it should be noted in lieu of a manifolds, individual passageways that are bent at multiple locations can achieve the same objective; specifically, to guide the combustion byproducts to travel back and forth within the tub assembly 40 through submerged passageways, that are completely encapsulated by the surrounding liquid, thereby increasing the residence time of the combustion byproducts and increasing the surface area in contact with both the hot combustion byproducts and water to increase the heat transfer delivered. For example, six individual tubes or passages that were each bent at 180 degrees at two separate locations would effectively achieve the same result as the aforementioned design. Likewise, more numerous, smaller tubular passageways with other bends could also be used to generate a more tortuous path and increase heat transfer surface area.

Returning to FIG. 3, the tub assembly 40 features incorporates a tub shelf 230 designed to rest on the container assembly's 20 integrated shelf 110 in order to partially support the weight of the tub and liquid within. While the current embodiment uses a single support shelf or ledge in the tub to rest on a corresponding shelf or ledge on the container assembly, it is of course understood that additional shelflike ledges could be employed for additional support and/or the shelf or shelves could be asymmetrically located to assure the tub cannot be improperly located into the container assembly. The drain 240 is located at the lowest location within the tub assembly 40 to enable complete discharge of fluid. A probe support 250 allows installation of the water level probe (not shown in FIG. 3) and a sensor mount 260 allows attachment of the thermostat or other temperature measuring device such as a thermocouple, RTD, thermistor and the like (also not shown in FIG. 3).

Figure 6:
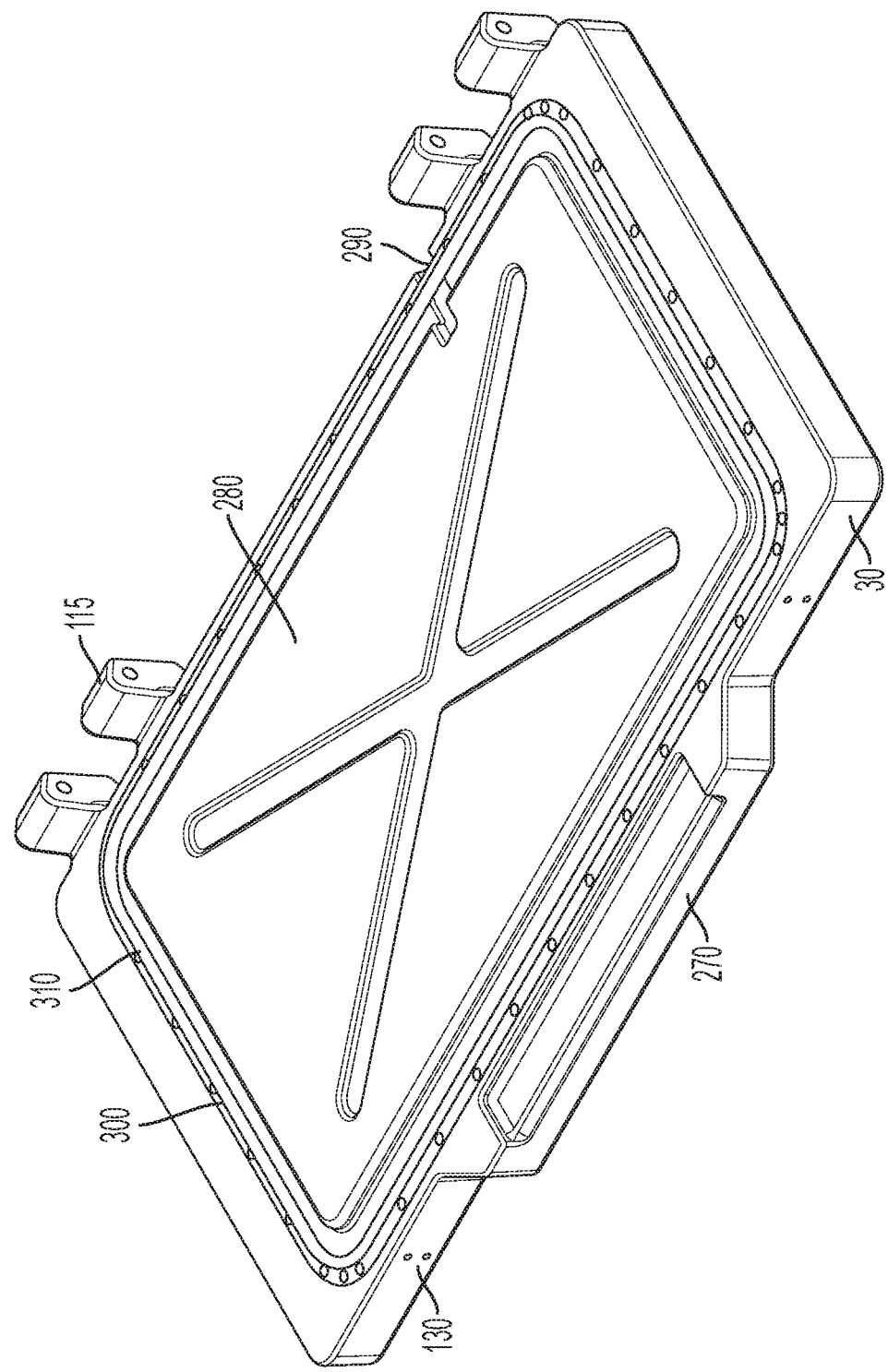
FIG. 6 shows a perspective view of the bottom side of the lid assembly for the lightweight portable heating device.

The lid assembly 30 has a number of features and those features are best shown in FIG. 6. The lid assembly 30, which is envisioned to be rotomolded, and foam filled, features integrated lid handle 270, integrated lid hinge 115, integrated lid support structure 280, integrated lid vent 290, and integrated lid gasket track 300. The integrated lid handle assists personnel to open the lid assembly 30. The integrated lid support structure 280 provides additional rigidity to the lid assembly 30. Integrated lid vent 290 provides a pressure vent to prevent a buildup of pressure within the tub assembly 30 when the fluid inside the tub assembly 30 is heated. The integrated lid hinge gasket track 300 holds a lid gasket 310 in order to provide a seal between the lid assembly 30 and the container assembly 20. Mold-in threaded inserts 130 can also be included during the rotomolding process to enable attachment of other parts or subassemblies. The internal cavity of the rotomolded lid may be optionally filled with foam (not shown) for the purposes of providing thermal insulation, noise insulation, increasing rigidity, and providing overall strength to the lid. As stated earlier when discussing foam filling the internal cavity created between the container assembly 20 and the tub assembly 40, there are many types of foams that can be used, some providing better stiffness or crush resistance white others providing better insulative or buoyancy benefits. As a minimum, polyurethane, polystyrene, syntactic and polyethylene foams can be used individually or combined in the internal cavities of the rotomolded tub and cover.

While the container assembly 20 is shielded from hot water due to the insulation and air spaces between the tub assembly 40 and the container assembly 20, the inside of the lid assembly 30 is exposed to convective and radiative heat transfer from the heated liquid in the tub. In one preferred embodiment, the container assembly rotational molding process utilizes a low-temperature melting point plastic, such at Low Density Polyethylene (LDPE) but the lid assembly 30 rotational molded part uses a higher melting point plastic, such as High Density Polyethylene.

FIG. 7 illustrates the burner box assembly 50. A burner 320 is housed within a burner box assembly 50 that protects the burner from rain and direct contact. The burner box assembly 50 consists of a burner box 330 and burner cover 340 attached by means of a burner cover hinge 350. The burner cover features a burner cover access 360 to allow interfacing with burner 320 without the need to open the burner cover 340. A latch bracket 370 and a latch 380 are mounted to the burner box 330 and burner cover 340 to ensure the cover remains in place during transportation and handling. A multitude of different burner adaptor plates 390 that accept a variety of different burner configurations 320 may be used to configure the burner box to accept a particular burner type installed within the burner box assembly 50 with each burner adaptor plate designed to accept the specific burner diameter, and burner mounting requirements. A combustor flange 400 can be secured to the burner box assembly 50 in order to prevent the flame and hot combustion byproducts from coming into unintended contact with the container assembly 20 or burning box assembly 50. A burner gasket 410 and a combustor gasket 420 prevent hot air from bypassing the combustor flange.

As further shown in FIG. 7, the burner box assembly 50 contains an electronic compartment 430 protected from the elements by an electronics cover 440. The electronic compartment 430 houses an electrical connector 450, breaker 460, and power switch 470 that are user accessible from the outside of the burner box assembly 50. Within the electrical compartment, there is a tilt switch 480 attached to a tilt switch bracket 490, a water level switch 500 connected to a water level probe 510, and a thermostat 520. The tilt switch 480 prevents unsafe operation of burner 320 when lightweight portable heating device 10 exceeds a predetermined tilt angle. The water level switch 500 prevents unsafe operation of burner 320 when liquid level is below the water level probe 510. The thermostat 520 prevents unsafe operation of the burner 320 when the liquid temperature is outside an acceptable range. A terminal strip 530 facilitates wiring among electronic components. An instrumentation gasket 540 located between the burner box 330 and container assembly 20 prevents the intrusion of water into the electrical compartment 430.

As shown in FIG. 8, drain plumbing 550 underneath the tub assembly's drain passes through the container assembly 20 to allow attachment of a drain valve 560 with standard plumbing connections. Also shown in FIG. 8 are skids 90 that can be made removable. These skids can be replaced when worn out due to the unit being slid across rough terrain. Not shown, but contemplated within the scope of the invention, are the wheel assemblies or hard mounting brackets that can be installed in place of the removable skids.

Figure 9:
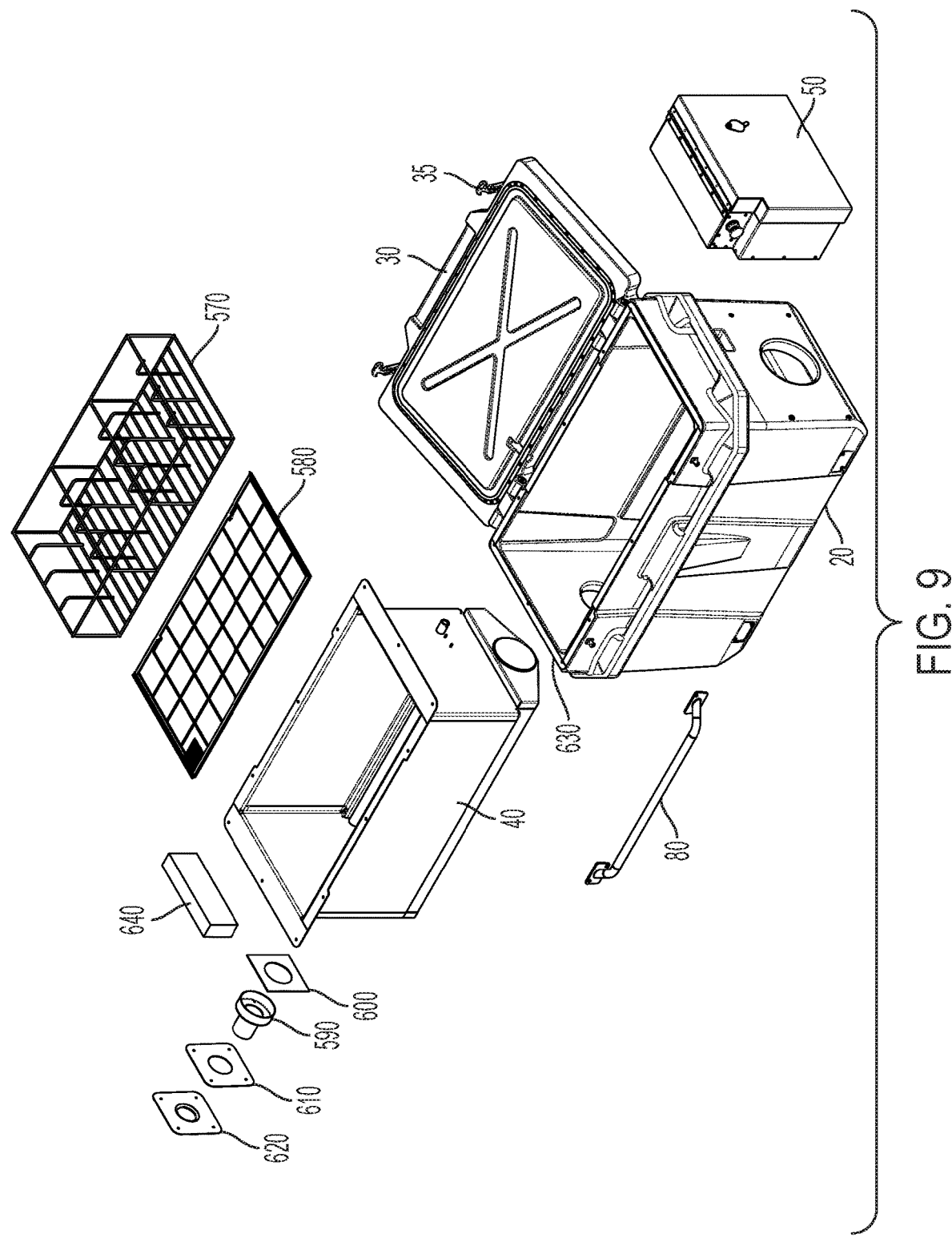
FIG. 9 is an exploded view showing the various components and assemblies of the lightweight portable heating device.

FIG. 9 provides a perspective exploded view of a number of components that constitute the lightweight portable heater device 10. A removable wire tray 570 can support a variety of enclosed food items (e.g. military's Unitary Group Rations (UGRs)) (not shown) with adequate spacing for proper heating. A removable screen 580 ensures that no food or foreign object of any kind will restrict the convective liquid flow around the combustion gas passages 170 or foul the exterior surfaces of the combustion gas passages. The removable screen also ensures that any sediment or debris is collected on the surface of the screen thereby allowing these deposits to be easily removed and properly disposed. Latch 35 secures the lid assembly 30 to the container assembly 20.

Also shown in FIG. 9 is an exhaust assembly that includes an exhaust tube 590 and exhaust container gasket 610 that prevents the exhaust gas from overheating the low melting point plastic of the container subassembly. Also shown in FIG. 9 is an exhaust tub gasket 600 that attaches to the tub assembly's exhaust port 220 to redirect exhaust gases out of the lightweight portable device 10. The exhaust tub gasket 600 also prevents gases from bypassing the exhaust tube 590. The exhaust tube 590 and exhaust container gasket 610 are centered in the opening in the container in order to provide an air gap to prevent overheating of the container plastic and are secured in place by means of an exhaust plate 620, which also prevents external rain or other objects from ingress into the container subassembly.

As further shown in FIG. 9, a tub gasket 630 placed between the tub assembly and container assembly prevents water ingress into the container subassembly's cavity. A compressible foam 640, located at the exhaust of the tub assembly between the tub assembly 30 and container assembly 20, provides a restoring force that pushes and seals the combustion gas chamber section 160 against the combustor flange 400 and accompanying combustor gasket 420 to prevent leakage of hot combustion byproducts.

It is understood that the described embodiment of totally submerging the combustion gas passages 170 and using a total of 19 combustion gas passages in three passes, with the first pass using seven passages 170A and the remaining two passes 170B & 170C using six parallel passages each has reduced the exhaust temperature to the point where centering the exhaust tube along with using the exhaust gaskets 600 and 610 on the tub and the container have been shown to be sufficient to prevent the overheating of the plastic tub material in the region surrounding the exhaust tube. However, should the exhaust gas temperature become much higher, (or the selection of a lower melting point plastic), where the higher exhaust gas temperature is a result of some change such as reduced heat transfer from the combustion gas passages or use of a less efficient burner it is to be understood, that the region surrounding the exhaust tube could be insulated with a high temperature insulation, or a ceramic liner (or other techniques well known in the art) to shield the rotationally molded plastic from these higher temperatures.

The described versions of the present invention have many advantages including improved heat transfer, improved ergonomics, reduced manufacturing cost, simplified maintenance, reduced noise, reduced vibration and reduced weight.

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

What is claimed is:

1. A tub assembly for a portable heating device, comprising:
   a first end wall;
   a second end wall and the second end wall is opposite the first end wall;
   an exit manifold proximate the second end wall;
   a bulkhead extending between the second end wall and the exit manifold;
   a first turning manifold proximate the second end wall;
   the bulkhead separates the exit manifold and the first turning manifold;
   a second turning manifold proximate the first end wall;
   a first side wall and a second side wall connecting the first end wall and the second end wall;
   a base connected to the first end wall, second end wall, first side wall, and second side wall, and the first turning manifold and the second turning manifold are positioned in the base; and
   a plurality of passages positioned in the base to run parallel to the first side wall and second side wall and the plurality of passages having end openings that extend into the first turning manifold and second turning manifold;
   a combustion gas chamber section in the base and adjacent the first end wall;
   wherein the plurality of passages comprises a first group of parallel flow passages extending from the combustion gas chamber section to the first turning manifold and directing hot combustion gas byproducts from the combustion gas chamber section to the first turning manifold, a second group of parallel flow passages extending from the first turning manifold to the second turning manifold and directing hot combustion gas byproducts from the first turning manifold to the second turning manifold, and a third group of parallel flow passages extending from the second turning manifold to the exit manifold and directing hot combustion gas byproducts from the second turning manifold to the exit manifold.

2. The tub assembly of claim 1, further comprising:
   an exhaust port, whereby the hot combustion gas byproduct travel from the exit manifold through the exhaust port and exit the tub assembly.

3. A portable heating device comprising:
   a container assembly having an exterior surface and an interior surface, at least one container hinge along a top edge of the container assembly and attached to the exterior surface, an integrated handle positioned proximate the top edge of the container assembly and molded as part of the exterior surface, integrated support structures molded on the exterior surface and molded into the integrated handle, and a pair of removable lifting handles, wherein the container assembly has an internal cavity between the exterior surface and the interior surface and has a support structure in the bottom of the container and the internal cavity is filled with a foam;
   a lid assembly pivotably having a lid hinge complementary to the at least one container hinge and attached to the at least one hinge on the container assembly;
   a tub assembly that fits inside the container assembly and having a base section, wherein the base section contains a plurality of passages that extend from a first end of the tub assembly having a first turning manifold to a second end of the tub assembly, and opposite the first end, having a second turning manifold, and wherein the tub assembly contains a combustion gas chamber positioned proximate the second end of the tub assembly;
   wherein the plurality of passages comprises a first group, a second group and a third group of parallel flow passages,
   wherein the first group of parallel flow passages directs hot combustion gas byproducts from the combustion gas chamber s echo n to the first turning manifold, the second group of parallel flow passages directs hot combustion gas byproducts from the first turning manifold to the second turning manifold, and third group of parallel flow passages directs hot combustion gas byproducts from the second turning manifold to an exit manifold.

4. The portable heating device of claim 3, further comprising:
   wherein the container assembly has an integrated shelf and the tub assembly has a tub shelf whereby the tub shelf rests on the integrated shelf to support the tub assembly when the tub assembly is filled with a liquid.

5. The portable heating device of claim 4, further comprising:
   a removable screen positioned on the tub shelf.

6. The portable heating device of claim 4, further comprising:
   a removable wire tray.

7. The portable heating device of claim 3, further comprising:
   molded threaded inserts included in the container assembly and lid assembly in order to secure essential and optional components onto either the container assembly and lid assembly.

8. The portable heating device of claim 3, further comprising:

wherein the lid assembly is filled with a foam and the lid assembly has an integrated lid handle, integrated lid support structure, integrated lid vent, and an integrated lid gasket track.

9. The portable heating device of claim 3, further comprising:
a burner box assembly secured to one end of the container assembly.

10. The portable heating device of claim 3, further comprising:
an exhaust assembly position on one end of the container assembly and including an exhaust tube, exhaust container gasket, an exhaust tub gasket, and an exhaust plate.

\* \* \* \* \*